May 6, 1952

R. C. SHOEMAKER 2,595,897

TRACTOR MOUNTED CRANE

Filed Nov. 1, 1945

INVENTOR
ROBERT C. SHOEMAKER

ATTORNEY

May 6, 1952 R. C. SHOEMAKER 2,595,897
TRACTOR MOUNTED CRANE
Filed Nov. 1, 1945 6 Sheets-Sheet 5

INVENTOR
ROBERT C. SHOEMAKER
ATTORNEY

May 6, 1952  R. C. SHOEMAKER  2,595,897
TRACTOR MOUNTED CRANE

Filed Nov. 1, 1945  6 Sheets-Sheet 6

INVENTOR
ROBERT C. SHOEMAKER

ATTORNEY

UNITED STATES PATENT OFFICE 2,595,897

TRACTOR MOUNTED CRANE

Robert C. Shoemaker, Portland, Oreg., assignor to Hyster Company, Portland, Oreg., a corporation of Oregon Application November 1, 1945, Serial No. 626,115

16 Claims. (Cl. 212—59)

This invention relates to tractor mounted cranes and pertains to various improvements over my prior patent for Tractor Mounted Crane, No. 2,362,220, issued November 7, 1944.

The general object of the invention is to provide an improved crane structure adapted to be readily mounted on a crawler type tractor as accessory equipment to temporarily convert the tractor into a crane, pile driver, dragline scraper, trench hoe, shovel or skimmer, or to facilitate the tractor mounting of such other accessories as rotary trenching machines, air compressors, pumps, well drills, post hole diggers, and the like, all of such accessory equipment being easily removable from the tractor so as to leave the tractor unimpeded for other work.

Most power cranes, shovels and like machinery fall into one of two general classes. The first class comprises the so-called full revolving cranes and shovels wherein the mast, boom, winches and power plant are all mounted on a revolving platform having unlimited pivotal movement. Such cranes and shovels are built for a particular purpose and are not intended ever to function as a tractor. This class of machinery is characterized by its mounting on rigid track frames carrying small tracks which cannot adapt themselves to the contour of uneven ground, and which carry power plants lacking adequate power to pull the units out of deep mudholes and the like. Frequent self-transportation of this class of conventional shovels is impracticable for any but short distances, as the tracks are subject to excessive wear when traveling. There is also a class of three-quarter swing cranes and shovels having certain advantages over full revolving shovels, but nevertheless mounted on similar small rigid track frames lacking the power and mobility of a tractor and subject to the same limitations as full revolving cranes and shovels for purposes of the present comparison.

The second of the two classes mentioned above includes conventional tractor mounted cranes. For the most part, this class of equipment constitutes a permanent tractor conversion wherein a first class tractor becomes a second class crane or shovel at a total cost in excess of the cost of a full revolving shovel with crane boom attachment. In effecting such conversion, it is the usual practice to remove or render inoperative the tractor spring, and to lock the traction unit into a rigid frame as in the case of previously mentioned full revolving shovels or cranes. By thus eliminating the track oscillation advantage of a tractor, the resulting equipment, though having greater power than a standard crane or shovel, lacks much of the advantage of a tractor. Conventional conversion equipment of this class also has other disadvantages in attempts to stress certain features and compromise others. Some are top heavy, some have poor visibility for the crane operator, and all presently known equipment of this class has the common disadvantage of so encumbering the tractor as to make repair and adjustment difficult and to make the unit practically inoperable as a tractor, without having the advantage of being easily removable to preserve the original functions of the tractor.

The primary objectives of the present invention are to overcome the shortcomings of the above mentioned classes of equipment through the provision of a readily installed and removable crane structure for a tractor of the class described, which not only leaves the tractor in its original operating condition when the accessory equipment is removed, but which permits the tractor to retain its inherent advantage of flexible traction units for negotiating rough terrain, even when the crane is installed.

Another important object is to provide a construction which does not interfere with the conventional bulldozer, so that the latter may be retained on the tractor to prepare a path when necessary, to scrape off a reasonably level spot for crane operation, and to be available for unrestricted use when the crane is temporarily removed, and in which the bulldozer performs the further useful function of serving as a counterweight for the crane.

Another object is to provide a sturdy and powerful crane which may be entirely erected manually without requiring extraneous equipment.

Another object is to provide a construction which may be disassembled into relatively few pin connected pieces for transportation in dump trucks and other vehicles ordinarily used with such equipment.

Another object is to provide a crane which may be carried, almost fully assembled on the tractor, on an ordinary low bed trailer with the mast and boom in a lowered position to pass legal road height limits.

Another object is to provide a construction which requires substantially no changes in the tractor for mounting and which, when mounted, does not interfere with the ordinary service and adjustments on the tractor.

Another object is to provide a construction in which light weight parts may be manually erected to form a structure for erecting the heavier parts.

Another object is to provide a construction having good visibility for the crane operator and which, at the same time, does not interfere with the visibility of the tractor operator in driving the tractor with the crane mounted thereon.

In my prior patent there is disclosed a conventional tractor of the type having flexible crawler traction units on opposite sides of a tractor body. The crawler units are mounted at the rear of the tractor body on a driving axle, and are mounted at the front of the tractor body on a resilient suspension, permitting the front ends of the traction units to move up and down independently to adjust themselves to uneven ground surfaces. A mast is mounted on horizontal pivots at the rear of the tractor body adjacent the rigid axle connecting the crawler units so as to receive substantially rigid support directly on the axle. In order to retain the flexibility of the traction units for use of the tractor with the crane installed thereon, the top of the pivotally mounted mast is backstayed to the front ends of the crawler traction frames by a flexible cable passing over a pulley attached to the masthead. In this way the spring mounting of the tractor body is retained even while the crane is in use, but crane loads are not transmitted to the spring in either downward or upward directions. Compensation for unevenness of the ground under the front of the traction units is effected by movement of the cable through the pulley, the mast being thereby backstayed to the traction units directly and independently of the tractor body. A hoist unit is removably mounted on the tractor at the base of the mast in association with a power take-off, this unit having a bull wheel for mounting a boom for use as a crane and the like employing the power of the tractor engine.

Further objects of the present invention comprise improvements in the various component parts of the crane structure individually and improvements in the general organization and construction better to fit the crane for the varied uses enumerated above.

A still further object is to provide a novel cooperation between the various component parts to facilitate transportation of the unit to its work location in a substantially fully assembled condition.

Other objects and advantages reside in the particular construction and arrangement of parts shown in the accompanying drawings and described in the annexed specification. Various changes will occur to those skilled in the art, and all such modifications are included in the invention. The present embodiment is illustrated by way of example only and not by way of limitation, the invention being limited only by the scope of the appended claims.

Figure 1:
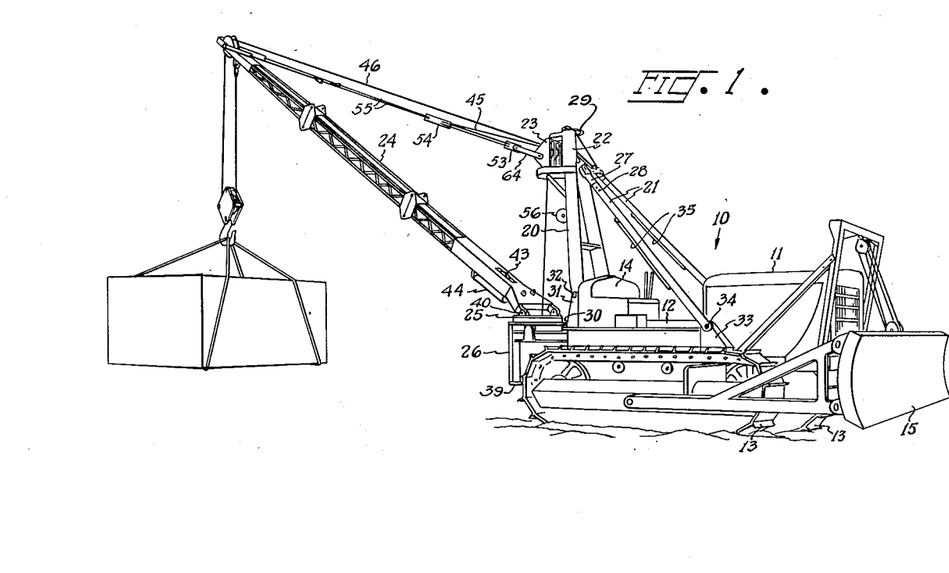
Figure 1 is a general view of the present crane rigged for hoisting.

The several views in the drawings illustrate the crane rigged in different ways for different kinds of work and partially dismantled in different ways for use of the tractor and for transportation on a trailer or the like. In Figure 1 the crane is shown rigged for hoisting work. The numeral 10 refers generally to a tractor of the type having an engine 11, a body 12, and driver's seat 14, all carried between a pair of crawler traction units 13. Mounted on the tractor in the usual manner is a heavy bulldozer blade 15 which is utilized in the practice of the present invention both to prepare a way for the crane and to level a spot for crane operation, and to serve as a counterweight to balance overturning moments.

Various features of the present crane construction are shown in copending application. A novel arrangement of mast 20 and backstay struts 21 which may be made flexible to take advantage of the spring suspension of the crawler traction units, or which may be locked into a rigid support base for the crane, is disclosed and claimed in my application, Serial No. 626,113, filed November 1, 1945, for Tractor Mounted Crane Mast and Backstay System. This application has now matured into Patent No. 2,564,929 issued August 21, 1951.

At the top of the mast is a masthead 22 including a novel fair-lead construction 23, as disclosed and claimed in my application, Serial No. 200,035, filed December 9, 1950, for Fair-Lead, which is a continuation-in-part of Serial No. 626,112 now abandoned, filed November 1, 1945, for Fair-Lead. The crane includes a boom 24 pivotally mounted on a bull wheel 25 for rotation on a hoist unit 26 which is removably mounted on the tractor so that it can be dismantled along with the mast and backstay system in the field without the use of special equipment. Certain details of construction of the boom and hoist unit and the manner in which these are mounted on the tractor form the subject matter of my copending application, Serial No. 626,114, filed November 1, 1945, for Crane Boom Assembly.

In a crane installation having the various features above referred to in my copending applications, there are semi-permanently mounted on a tractor a rear mounting bracket 30 having a pair of upstanding arms 31 upon which the mast 20 is supported on heel pins 32. The bracket 30 may be made in one piece, or it may comprise two separate parts each including one of the arms 31. A bracket 33 is rigidly mounted on each of the crawler traction unit frames near the front end thereof and provided with a pin connection 34 for the lower end of one of the tubular backstay struts 21. The upper ends of the backstay struts are pin connected with the opposite ends of an equalizer beam which is in turn pivotally mounted on the masthead by means of a bolt or pin through its mid point. Means are provided as above mentioned for allowing the free pivotal movement of the equalizer beam when the tractor is in motion to accommodate the rise and fall of the front ends of the traction units under the spring action of the tractor spring and for locking said beam in various adjusted positions to prevent independent movements of the traction units when it is desired to provide a rigid operating base for the crane. The struts 21 have end portions 27 which may be secured at various lengths within the struts by placing a pin 28 in one of a series of spaced holes, as shown, to vary the inclination of the mast as desired. A pair of props 35 are pivotally connected with the backstay struts 21 to serve a purpose which will presently appear as the description proceeds.

The mast and backstay system just described may be used for mounting other power operated equipment on the mounting bracket 30 in driving engagement with a power take-off gear connected with the tractor transmission and power plant. Although the present construction and various parts thereof have various uses of this nature, the present embodiment shows the use of the invention primarily as applied to a crane structure for hoisting and dragline scrapping operations to illustrate the most comprehensive features of the invention.

Figures 2, 3:
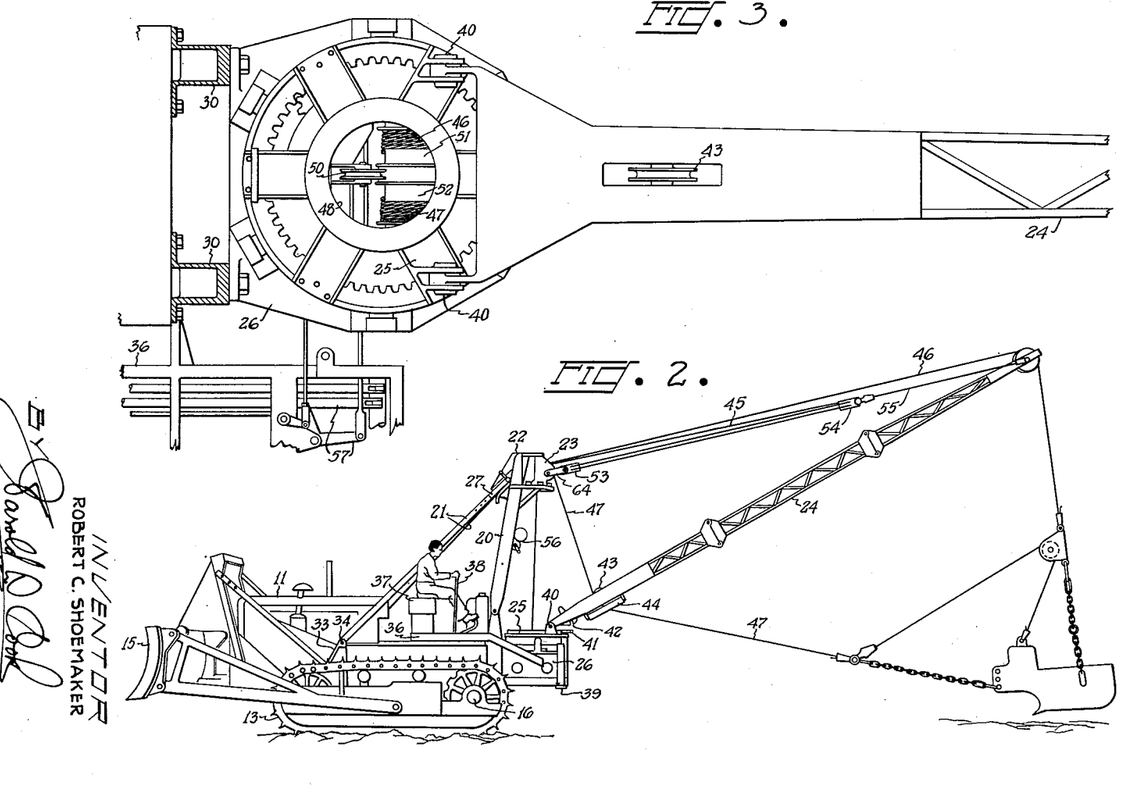
Figure 2 is a view showing the other side of the crane and showing the rigging for dragline scraper operation.
Figure 3 is a fragmentary plan view showing the hoist unit and lower end of the boom.
Figure 4:
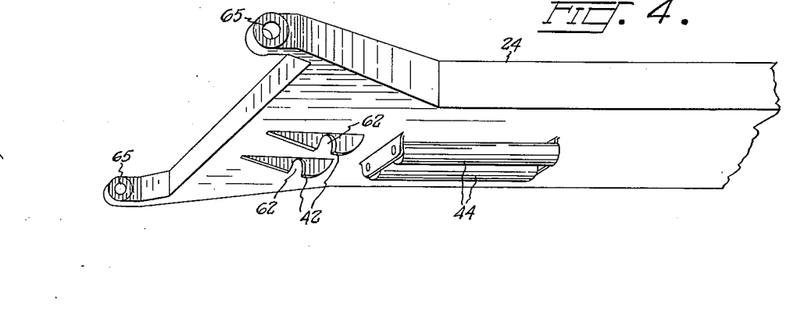
Figure 4 is a fragmentary perspective view showing the under side of the heel section of the boom.

As will be seen in Figure 2, the hoist unit 26 also includes as an integral part thereof an operator's platform 36 having a seat 37 and controls 38 thereon for controlling the rotation of the bull wheel 25 and various winches within the hoist unit. The hoist unit is also provided with a pair of extensible jack legs 39 offset slightly to the rear of the boom mounting on the bull wheel. The boom mounting is effected through a pair of heel pins 40 in the base section of the boom which permit pivotal movement on the bull wheel. The bull wheel is provided with an auxiliary pivot 41 extending beyond the rear edge thereof directly beneath the boom in a position for engagement by a slot in the ears or lugs 42 in the under side of the boom when the latter is lowered to a horizontal position. The utility of this feature will presently become apparent in connection with the erection and dismantling of the boom. The numeral 43 refers to a dragline sheave in the boom, and the numeral 44 refers to a pair of fair-lead rollers associated therewith.

When the crane is rigged for hoisting as in Figure 1, there are two lines disposed through the masthead fair-lead 23, one of these being a boom suspension line 45 and the other being the hoist line 46. When the crane is rigged for use with a dragline scraper as in Figure 2, the scraper line 47 is rigged through the boom sheave 43 and also through the fair-lead 23 along with the two lines previously mentioned, the hoist line 46 then serving as a haul-back line for the scraper. In this way, all the lines are handled by the masthead fair-lead 23 so as to descend vertically to the hoist unit through a central cable opening 48 in the bull wheel. Looking downwardly through the cable opening 48 in Figure 3, there appears a sheave 50 and a pair of cable drums 51 and 52 for receiving the cables 46 and 47. These three cables are received by the sheave 50 and the drums 51 and 52 closely adjacent the axis of rotation of the bull wheel, and the mast is adjusted so that as the points of delivery of these cables from the fair-lead 23 are vertically thereabove to lead from a remote point, so that as the boom swings from side to side the cables will twist without coming into contact with each other for proper spooling on the winch drums. When the crane is rigged in this manner, the boom suspension line 45 itself forms the true axis of rotation of the boom and the cables 46 and 47 are grouped closely thereadjacent. By adjusting the backstay system to maintain the three lines vertical between the masthead and the hoist unit, the crane boom is not affected by inclination of the bull wheel axis by reason of the tractor facing either uphill or downhill on sloping ground. Regardless of tilt in the bull wheel axis, the crane boom will not swing by gravity as long as the position of the masthead is properly adjusted, and this feature is of considerable advantage and extends the usefulness of the crane for operation on sloping ground.

Figure 8:
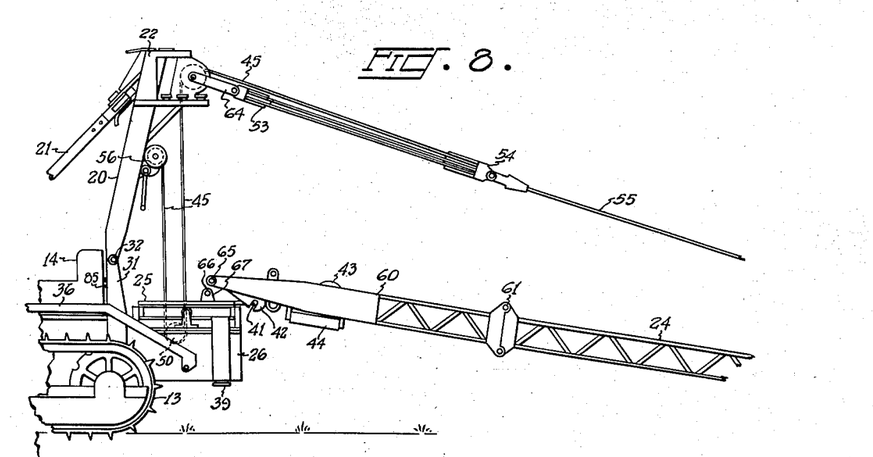

The boom suspension line 45 is trained through a lower boom suspension block 53 linked to the fair-lead 23 and an upper boom suspension block 54 connected with the boom suspension links 55. This pulley block arrangement provides sufficient mechanical advantage for raising the boom by a hand winch 56 on the mast, if so desired, in which case the line 45 may merely pass around the sheave 50 and then return to the winch 56. Alternatively, the boom suspension line 45 may pass from the sheave 50 to either a power operated or hand operated winch in the hoist unit 26. The rigging may thus be varied to suit the crane operator and the facilities provided in the hoist unit, it being immaterial where the boom suspension line is trained after it leaves the sheave 50. The plan view in Figure 3 includes a fragmentary portion of the control platform 36 and certain links 57 connecting the hoisting clutches with the control levers 38 for operating the crane. In Figures 1 and 2 the boom suspension line leads to a winch in the hoist unit, while Figure 8 illustrates the manner of returning this line to the hand winch 56 for raising and lowering the boom.

The rigging for the above described arrangement of the masthead and fair-lead 23 and hoist unit 26 effects a number of advantages in operation and construction in addition to certain advantages already pointed out. One basic advantage of this arrangement is that the bull wheel 25 is required to withstand only the end thrust of the boom. The overturning stresses are resisted entirely through the masthead and backstay system independently of the bull wheel and tractor body. This reduces the frictional drag on the bull wheel rollers and relieves the tractor body and tractor spring of the major stresses incident to crane operation. The overturning forces are transmitted by the backstay struts 21 directly to the crawler traction units which are locked into a rigid crane base while the crane is in use. The locking of the backstay system in this manner does not impair the springing of the tractor body on its front spring mounting, but it does prevent individual oscillation of the traction units about their common axle 16 such as would be produced by overturning forces if the backstay system were unlocked. When the crane boom is swung to the rear of the tractor, the heavy bulldozer blade constitutes an effective counterbalance on the front end, and for additional stability the tractor may be partially backed up on a heavy timber or the like to extend the point of ground support rearwardly of the axle 16. The crane will lift a greater load at the rear than at the side of the tractor, without overturning. For still greater stability and load lifting capacity with a long boom the masthead may be externally guyed by means of eyes 29 to utilize the reserve power of the tractor engine.

The present crane structure, rigged as shown in Figure 2, is also particularly advantageous for dragline scraper operations, as it provides a relatively low position for the dragline sheave 43. The mounting of the hoist unit is low to the ground to provide a low boom mounting and to allow clear visibility for the crane operator thereabove. The operator's platform 36, being at one side of the mast and boom, provides a clear view of the operation in any position of the boom and, at the same time, avoids interference with the driver's seat of the tractor. Likewise, there is relatively no impairment of the tractor driver's vision or control of the tractor with the complete crane mounted thereon.

Figure 5:
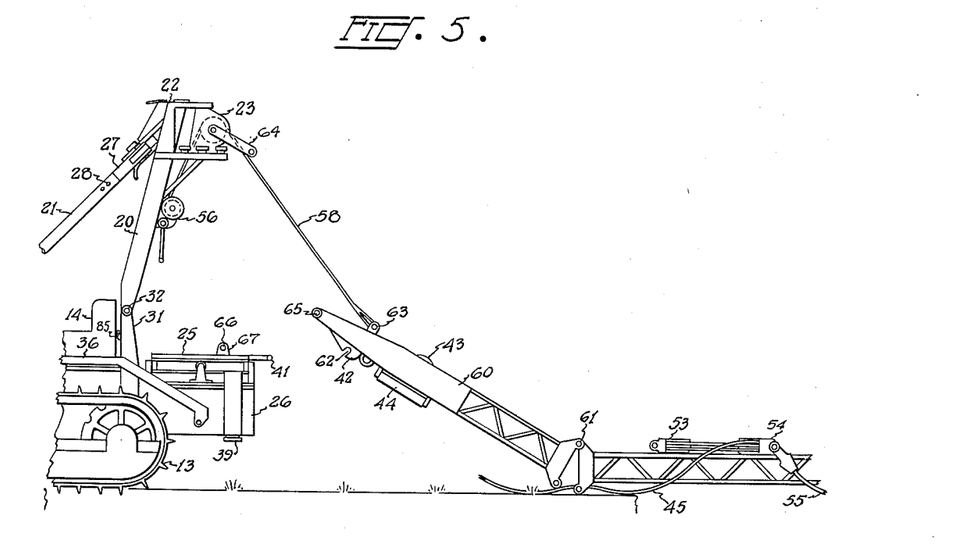
Figures 5, 6, 7 and 8 illustrates a sequence of steps in the erection of the boom.
Figure 6:
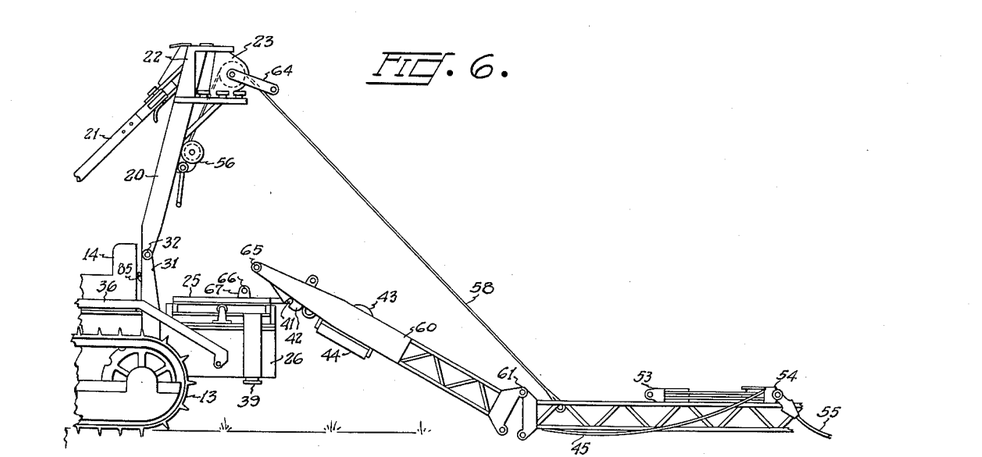
Figure 7:
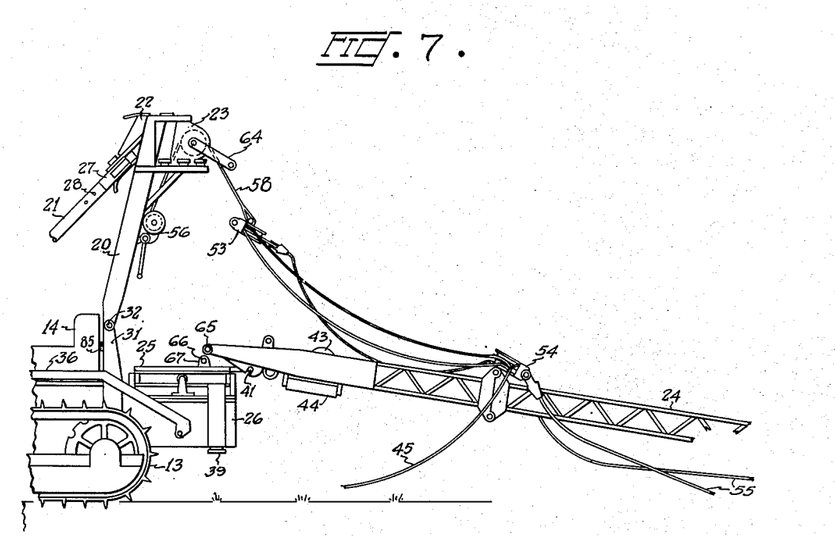

A sequence of steps for erecting the boom is shown in Figures 5 to 8. In Figure 5 the mast and backstay system and the hoist unit are already mounted on the tractor in a manner described in my co-pending applications, and the boom is laid out on the ground in a convenient position. A short line 58 is wound on the drum of the hand winch 56 and trained through the fair-lead 23 for raising the heel section of the boom above the level of the hoist unit. An eye 63 or other convenient fastening may be provided on the top side of the boom for temporarily fastening the line 58 in the manner shown. The boom might be raised as a rigid unit if it were not too long or too heavy, but in most cases it is preferred to first raise only the heel section 60 by removing two pins in the first joint to form a hinge 61 whereby the remainder of the boom may continue to rest on the ground in the initial stage of erection. The tractor is then backed under the raised end of the boom so that the auxiliary pivot 41 on the bull wheel may be engaged in a notch 62 in the spur or ears 42. The line 58 may then be removed from the eye 63 and secured just beyond the joint 61 as shown in Figure 6. Then the whole mid section of the boom is raised so that the pins which were removed to make the joint 61 may be replaced, whereupon the boom will support itself upon its tip and the auxiliary pivot 41 as shown in Figure 7.

With the boom sections thus connected together, the line 58 may be removed from the boom and attached to the lower boom suspension block 53 to raise it up for connection with a pair of links 64 on the fair-lead 23. After the block 53 is connected as shown in Figure 8, the boom suspension line 45 is reeved through the fair-lead for connection either with the hand winch 56 or a hand or power operated winch in the hoist unit. Alternatively, the line 45 may be trained around the sheave 50 in the hoist unit and thence back up to the hand winch 56 for manual raising of the boom tip. The position of the auxiliary pivot 41 is such that as the boom tip is raised the openings 65 in the heel end will gradually come into registry with the opening 66 in the bull wheel mounting bracket 67 for insertion of the heel pins 40. Either just before or after the raising of the boom tip to insert the heel pin 40, the hoist line 46 may be replaced through the boom tip sheave and fair-lead 23. Whenever it is desired to remove the boom from the hoist unit, the above procedure may be reversed to leave the boom lying on the ground for remounting on the tractor or for dismantling for removal to another scene of operation, or for installation or removal of mid sections as required to alter the boom length.

Figure 9:
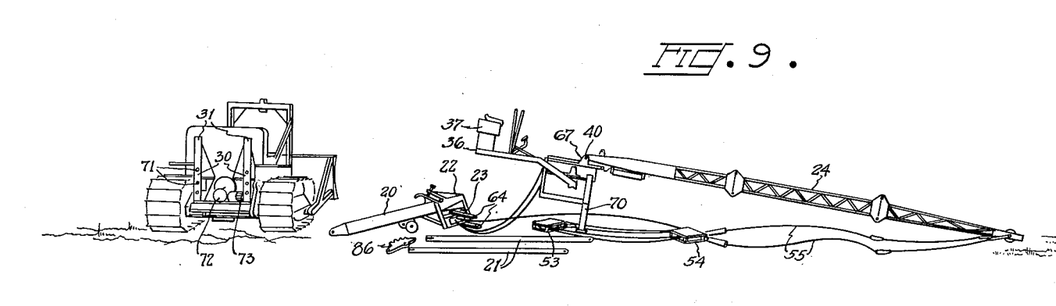
Figure 9 is a general view showing one manner in which the boom and hoist unit may be removed from the tractor without complete dismantling.

If it is desired to remove the boom and hoist unit temporarily to make the tractor available for other use, this purpose can be accomplished most conveniently in the manner illustrated in Figure 9. With the present construction it is easier to remove the hoist unit along with the boom than to remove these two parts separately, and hence, if the crane is to be used again at the same location, the mode of dismantling shown in Figure 9 would be preferable to the removal of the boom and hoist unit separately. The hoist unit is provided with a pair of jack legs 70 which may be extended to form two legs of a tripod support in which the third leg is formed by the boom tip in the manner shown. Removal of the boom and hoist unit together in this manner is accomplished by first lowering the boom to a horizontal position to engage the auxiliary pivot 41 in the notch 62 and then extending the jack legs to rest upon the ground. As more particularly described in my copending application entitled Crane Boom Assembly, the hoist unit 26 is attached to the mounting bracket 30 by a relatively few bolts which may be removed when the jack legs are thus extended to support the hoist unit detached from the tractor. The weight of the boom overbalances the weight of the hoist unit and operator's platform so that the boom tip may then be lowered to the ground where the assembly will rest in a stable position as shown in Figure 9.

The tractor may then be used in either of two ways. The rigging may be removed from the fair-lead 23 and the tractor may be used for most purposes with the mast mounted thereon by merely unlocking the backstay system to permit free independent oscillation of the crawler traction units. However, the mast and backstay struts may also be removed, if desired, in the manner described in my application entitled Tractor Mounted Crane Mast and Backstay System, so that these elements may be left parked with the boom and hoist unit until they are again needed. The dismantling procedure illustrated in Figure 9 was accomplished in this manner. The rear view of the tractor in Figure 9 discloses the mounting bracket 30 as comprising in fact two separate brackets embracing the upstanding arms 31 and individually semi-permanently attached to the back of the tractor. The upper ends of the arms 31 provide the support for the mast 20 and the lower parts of these arms constitute a pair of surfaces in a vertical plane against which the hoist unit is mounted by bolts in the holes 71. There also appears on the back of the tractor a power take-off 72 having a spur gear 73 driven through the tractor transmission from the tractor power plant. The hoist unit is provided with holes registering with the holes 71, so that when the bolts are inserted and tightened therein a spur gear in the hoist unit is brought into mesh with the driving gear 73 to provide power for rotating the bull wheel and operating the various power winches.

Figure 10:
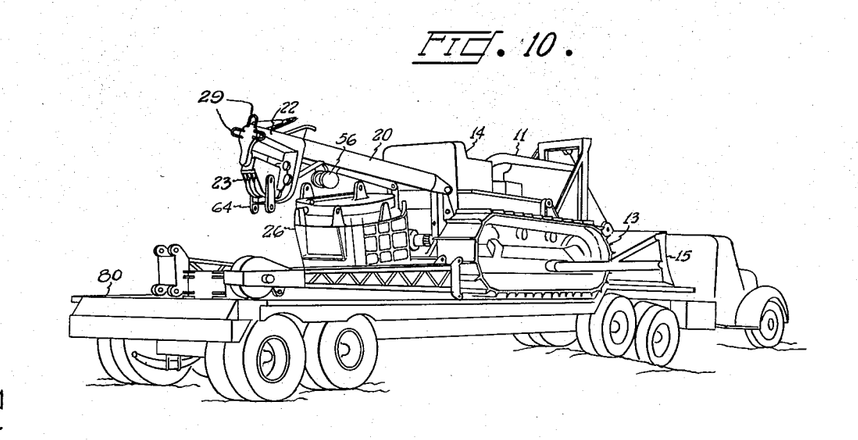
Figure 10 is a general view showing how the tractor and crane parts may be hauled on a trailer with the crane in a substantially completely dismantled state.

If the crane is to be moved a considerable distance to a new theater of operation, it may be dismantled and loaded on a trailer as shown in Figure 10. The boom and transmission unit have here been separately removed and the boom has been dismantled into its various sections for convenience in handling and all the parts are carried together on the trailer so that the whole moving operation is accomplished in one trip with one large vehicle. It is noted that the mast is still mounted on its heel pins on the bracket arms 31, but that the backstay struts have been removed permitting the mast to be swung downwardly to the rear to reduce the overhead clearance required on the highway.

When the trailer 80 reaches its destination the mast and backstay system and the hoist unit may be erected while the tractor is still on the trailer if desired. This would be preferable in the situation illustrated in Figure 10, inasmuch as it would be easier to erect the mast and backstay struts than to remove the mast so that the tractor could be moved off the trailer. Then, if the individual boom sections could be handled manually, they may be connected together on the ground, and the tractor, with the mast and hoist unit already mounted, could be driven off, and the boom could then be erected in the manner illustrated in the present Figures 5 to 8.

Figure 11:
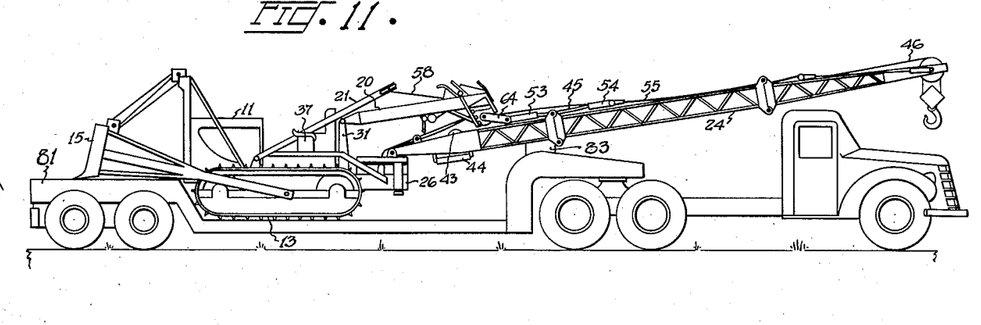
Figure 11 illustrates a manner in which the mast, backstay struts and boom may be lowered for transportation.

Figure 11 illustrates another manner of transporting the crane in which neither the mast nor the boom is removed from the tractor, but in which these parts are lowered sufficiently to pass under ordinary street and highway obstructions. Here the backstay struts are not removed, but they are disconnected from the mast which is then allowed to swing to the rear so as to rest upon the boom. A block 83 is preferably placed under the boom to hold it up off the auxiliary pivot 41. In this position the boom is inclined only slightly above the horizontal and at an angle just sufficient to clear the cab of the truck. When the trailer 81 arrives at its destination, the mast would first be erected in the manner shown in my application entitled Tractor Mounted Crane Mast and Backstay System, and then with the rigging of the boom the crane would be completely assembled and ready for operation. It may also be noted that if there is any object or advantage to be attained, the crane may not only be erected on the trailer but may thereafter be used for crane operations on the trailer within the load limits of the vehicle.

Figure 12:
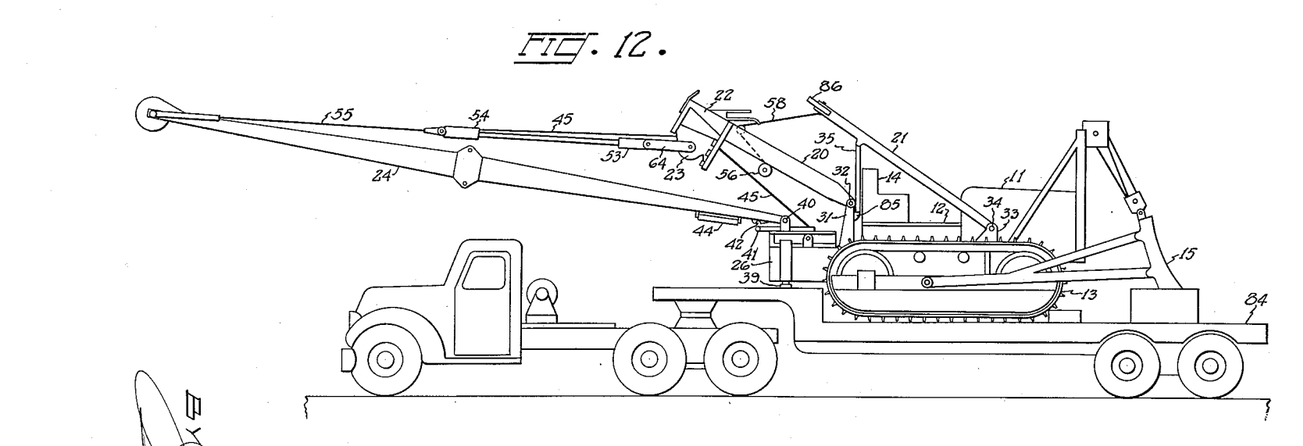
Figure 12 illustrates a manner in which the crane mast and other parts may be supported at reduced elevation for hauling on a trailer, or for traveling on the road under its own power.

Figure 12 shows still another manner in which the crane may be transported to its theater of operation, and in this case not only are all the component parts mounted on the tractor, but a considerable portion of the rigging is left intact to reduce the amount of work in the final erection. In this manner of transportation, the backstay struts are supported by their props 35 on supporting lugs 85 on the rear sides of the upstanding bracket arms 31 to form a temporary boom in the manner illustrated in greater detail in my application entitled Tractor Mounted Crane Mast and Backstay System. The line 53 from the winch 56 may then be secured to the equalizer beam 86 interconnecting the two backstay struts to support the mast in the inclined position shown, so that it can in turn support the boom in a nearly horizontal position above the cab of the truck without any blocks or props therebeneath and without coming into contact with the auxiliary pivot 41. This can be done by locking the hand winch 56 and by setting the brakes on the winch on which the boom suspension line 45 is secured. When the crane is to be assembled from this condition, the boom is first lowered upon an outside support and the boom suspension lines slacked off to allow erection of the mast in the manner previously described. Then the boom may be rigged for hoisting or scraper work and the tractor with the fully rigged crane may be driven off the trailer to commence crane operations.

The variations in the procedure for erecting and dismantling the crane structure, and particularly the various ways in which the structure may be partially dismantled, either for temporary parking or for transportation, all tend to emphasize the greatest advantage of the invention, which is that it constitutes a conversion unit for a crawler type tractor which is readily removable, either in whole or in part, in the field to leave the tractor unimpeded for its usual work. Whereas attempts in the past to convert a tractor into a crane have so compromised the utility of the tractor as to be of uncertain advantage over the other conventional equipment, the present construction effects the conversion to a crane only when a crane is needed and does not modify or impair the characteristics and advantages of a flexible crawler type tractor.

Having now described my invention and in what manner the same may be used, what I claim as new and desire to protect by Letters Patent is:

1. A tractor mounted mast and boom assembly comprising mounting means on said tractor, a stationary mast detachably mounted on said means, a hoist unit detachably mounted on said means, means for pivotally and rotatably mounting a boom on said hoist unit, a central cable opening in said boom mounting means, a boom removably mounted on said boom mounting means, a masthead fair-lead on said mast in approximate vertical alignment above said cable opening and rotatable independently of said mast and boom, and hoist and boom suspension lines leading from said hoist unit through said cable opening to said fair-lead.

2. A tractor mounted mast and boom assembly comprising a relatively stationary mast, an independently rotatable masthead fair-led on said mast, a hoist unit mounted on the tractor at the base of said mast and having cable drums approximately vertically beneath said masthead fair-lead, a bull wheel mounted for rotation on said hoist unit, a central cable opening in said bull wheel, a boom pivotally mounted on said bull wheel, and hoist and boom suspension lines extending through said cable opening and through said masthead fair-lead to the tip of said boom.

3. A tractor mounted mast and boom assembly comprising a mast support on said tractor, a hoist unit detachably mounted on said mast support, a bull wheel on said hoist unit, a boom pivotally mounted on said bull wheel, a mast pivotally mounted on said mast support above the level of said boom mounting to allow said mast to be inclined over said boom, a masthead fair-lead on said mast, adjustable backstay means for said mast to hold said fair-lead approximately in vertical alignment with said bull wheel, and hoist and boom suspension lines leading from said hoist unit to said masthead fair-lead and thence to the tip of the boom.

4. A tractor mounted mast and boom assembly comprising a bull wheel mounted on said tractor for rotation around a substantially vertical axis, a boom pivotally mounted on said bull wheel, a mast pivotally mounted on said tractor adjacent said bull wheel, a masthead fair-lead on said mast carrying hoist and boom suspension cables, a pair of rigid backstay struts connecting said masthead with traction units on the tractor at points remote from said mast, and means for adjusting said backstay struts to maintain said fair-lead substantially in vertical alignment above the center of said bull wheel regardless of inclination of the axis of rotation of the bull wheel.

5. A tractor mounted mast and boom assembly comprising a mast support on said tractor, a hoist unit detachably mounted on said mast support, a bull wheel mounted on said hoist unit, a boom pivotally mounted on said bull wheel, and a mast pivotally mounted on said mast support above the level of said boom mounting to collapse horizontally and compactly on top of said boom, said mast having a masthead fair-lead for hoist and boom suspension cables running from said hoist unit to the boom tip.

6. A tractor mounted mast and boom assembly comprising a mast, a masthead fair-lead on said mast, a hoist unit including a plurality of cable drums at the foot of said mast approximately vertically beneath said fair-lead, a bull wheel mounted on said hoist unit above said drums and having a central cable opening therein, a boom pivotally mounted on said bull wheel, a fair-lead in the base of said boom, a boom suspension cable from said hoist unit passing through said cable opening and said masthead fair-lead, a second cable from said hoist unit passing through said cable opening and said masthead fair-lead and passing over the tip of said boom, and a third cable passing through said cable opening and through said masthead fair-lead and thence through the fair-lead in the base of said boom.

7. A tractor mounted dragline scraper comprising a mast on said tractor, a masthead fair-lead on said mast, a hoist unit including a plurality of cable drums at the base of said mast and approximately vertically beneath said masthead fair-lead, a bull wheel on said hoist unit having a cable opening above said drums, a boom pivotally mounted on said bull wheel below the base of said mast, a fair-lead in the heel end of said boom low above the ground, a boom suspension cable passing through said cable opening and said masthead fair-lead, a scraper haul-back cable passing through said cable opening and said masthead fair-lead and passing over the tip of said boom, and a scraper cable passing through said cable opening and masthead fair-lead and thence downwardly through said fair-lead in the heel end of said boom.

8. A tractor mounted dragline scraper comprising a relatively stationary mast on said tractor having a masthead fair-lead, a stationary hoist unit at the base of said mast having a plurality of cable receiving means approximately vertically beneath said fair-lead, a bull wheel on said hoist unit, a boom pivotally mounted on said bull wheel, a fair-lead on the lower end of said boom, a boom suspension cable from one of said means passing through said bull wheel and said masthead fair-lead, a haul-back line from another of said means passing through said bull wheel and said masthead fair-lead and passing over the tip of said boom, and a scraper line from a third one of said means extending through said bull wheel and said masthead fair-lead and thence through said fair-lead at the lower end of said boom.

9. A tractor mounted mast and boom assembly comprising a rotatable boom mounted on a tractor, a non-rotatable mast pivotally mounted on said tractor for movement about a transverse horizontal axis through its base, a pair of backstay struts for said mast pivotally connected with traction units on said tractor, means for supporting said backstay struts in a lowered position so as to constitute a boom, means for supporting said mast in an inclined position from said struts, and means for supporting said boom from said mast in a substantially horizontal position for transportation of said assembly with all of the parts below the normal height of the mast.

10. A tractor mounted mast and boom assembly comprising a tractor body, a mast support on said body, a mast pivotally mounted on said support for rearward inclination, means for mounting a boom on said mast support at the base of said mast, a boom suspension line for supporting the tip of said boom from said mast, backstay means for staying the head of said mast from said tractor, and means for supporting said mast from said backstay means in an inclined position at reduced elevation with said boom supported in substantially horizontal position from said mast for transportation of said assembly with reduced clearance.

11. A tractor conversion unit comprising a mounting bracket secured on said tractor, a power take-off gear from said tractor adjacent said bracket, means on said bracket for mounting various power operated equipment in driving engagement with said power take-off gear, and a crane mast on said bracket in overhanging position above such equipment to provide lifting support in mounting and dismounting said equipment on said bracket.

12. A tractor conversion unit comprising a mounting bracket having a pair of upstanding arms secured on the rear of said tractor for mounting a crane mast, a power take-off gear from said tractor extending through said bracket between said arms, and means on said bracket for mounting power operated equipment in driving engagement with said power take-off gear.

13. In a tractor mounted crane, a relatively stationary mast having a masthead, a fair-lead on said masthead, a winch on said mast, a hoist unit mounted on the tractor independently of said mast at the base thereof, a free sheave in said hoist unit, a cable opening in said hoist unit above said sheave, a revolving boom on said hoist unit, and a boom suspension line leading through said fair-lead, around said free sheave in said hoist unit and thence back to said winch.

14. In a tractor mounted crane, a mast, a masthead fair-lead on said mast, a winch on said mast, a hoist unit on the tractor at the base of said mast having a cable opening for receiving a plurality of lines from said fair-lead, and a free sheave in said hoist unit for returning one of said lines to said winch.

15. In a tractor mounted crane adapted for dragline scraper work, a relatively stationary mast on the tractor, a masthead fair-lead mounted for independent rotation on said mast, a stationary hoist unit mounted on the tractor at the base of said mast, a boom and bullwheel assembly mounted on said hoist unit to swing about a vertical axis, a fair-lead carried by said assembly at the base of the boom, a scraper cable extending from said hoist unit to said masthead fair-lead and thence over the tip of the boom, and a scraper cable extending from said hoist unit to said masthead fair-lead and thence through said fair-lead at the base of the boom on the boom and bullwheel assembly.

16. In a tractor mounted crane, a relatively stationary mast mounted on said tractor, a masthead fair-lead on said mast, a stationary hoist unit mounted on said tractor at the base of said mast, a bullwheel on said hoist unit, a boom pivotally mounted on said bullwheel, a fair-lead on said boom at the base of the boom, boom suspension and hoisting cables extending from said hoist unit to said masthead fair-lead and thence to the tip of the boom, and a cable extending from said hoist unit to said masthead fair-lead and thence through said fair-lead at the base of the boom.

ROBERT C. SHOEMAKER.

REFERENCES CITED

The following references are of record in the file of this patent:

UNITED STATES PATENTS

| Number | Name | Date |
|---|---|---|
| 272,572 | Merrifield | Feb. 20, 1883 |
| 494,473 | Garrison | Mar. 28, 1893 |
| 739,955 | De Vow | Sept. 29, 1903 |
| 848,231 | Flynn | Mar. 26, 1907 |
| 1,412,525 | Howlett | Apr. 11, 1922 |
| 1,856,907 | Chapman | May 3, 1932 |
| 1,917,053 | Nelson et al. | July 4, 1933 |
| 2,068,397 | Chapman | Jan. 19, 1937 |
| 2,362,220 | Shoemaker | Nov. 7, 1944 |